US 7,108,382 B2
Sep. 19, 2006

(12) United States Patent
Oross

(10) Patent No.: US 7,108,382 B2
(45) Date of Patent: Sep. 19, 2006

(54) DIGITAL PROJECTOR ACCESS PANEL

(75) Inventor: Glen A. Oross, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 10/616,677

(22) Filed: Jul. 8, 2003

(65) Prior Publication Data
US 2005/0007559 A1    Jan. 13, 2005

(51) Int. Cl.
G03B 21/14    (2006.01)
G03B 21/22    (2006.01)
G03B 21/00    (2006.01)

(52) U.S. Cl. ...................... 353/119; 353/122
(58) Field of Classification Search .......... 353/119, 353/87, 85, 52, 56, 61, 122; 362/285, 254, 362/288, 372, 374, 365, 362; 348/744, 789; 349/5, 7
See application file for complete search history.

(56) References Cited

U.S. PATENT DOCUMENTS

| 3,787,674 | A | * | 1/1974 | Binzer et al. ............... 362/85 |
| 5,713,652 | A | * | 2/1998 | Zavracky et al. ........... 353/122 |
| 5,855,488 | A | * | 1/1999 | Heintz et al. .............. 439/310 |
| 6,082,864 | A | | 7/2000 | Rodriguez, Jr. et al. |
| D443,630 | S | | 6/2001 | Salvatori |
| 6,250,004 | B1 | * | 6/2001 | Kondo .................... 40/642.02 |
| 6,454,418 | B1 | | 9/2002 | Lee et al. |
| 6,726,336 | B1 | * | 4/2004 | Matsuda et al. ............ 353/122 |
| 2001/0046072 | A1 | * | 11/2001 | Takada ...................... 359/15 |
| 2002/0008852 | A1 | * | 1/2002 | Onishi et al. ................ 353/57 |
| 2002/0018186 | A1 | | 2/2002 | Sea-Huang et al. |
| 2003/0151922 | A1 | * | 8/2003 | Peng et al. ................. 362/372 |
| 2003/0234335 | A1 | * | 12/2003 | Umberg ..................... 248/551 |

FOREIGN PATENT DOCUMENTS

TW    500968    *    9/2002

\* cited by examiner

Primary Examiner—W. B. Perkey
Assistant Examiner—Rochelle Blackman

(57) ABSTRACT

A digital projector is provided that includes a projector housing, and a manually openable panel that provides access to the interior of the projector housing. The panel is configured so that it remains associated with the projector housing while open.

14 Claims, 3 Drawing Sheets

DIGITAL PROJECTOR ACCESS PANEL

BACKGROUND

Digital projection systems may be used to display a still or video image, or to enable the image to be viewed simultaneously by a large or small audience. As digital projectors become smaller and more versatile, they may be used in a variety of different environments and positions, either temporarily or as a permanently mounted fixture. In any environment, access to the internal components of the projector may be hindered by the projector design, or the orientation of the projector, making routine maintenance, repair, or upgrading of the projector more difficult.

SUMMARY

A digital projector is provided that includes a projector housing, and a manually openable panel that provides access to the interior of the projector housing. The panel is configured so that it remains associated with the projector housing while open.

DETAILED DESCRIPTION

Figure 1:
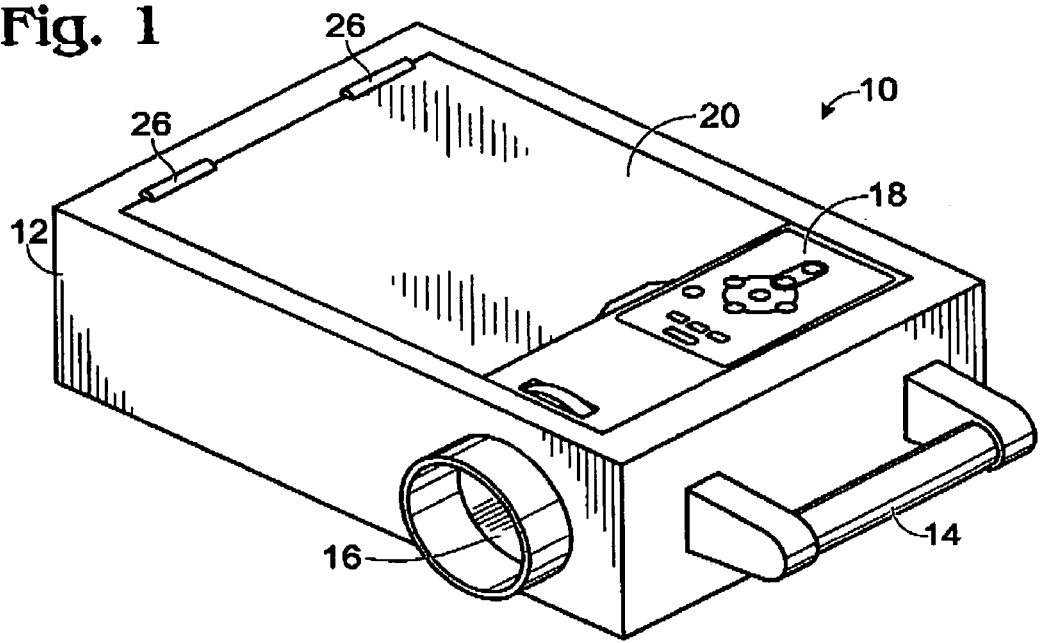
FIG. 1 is a digital projector according to an embodiment of the invention.

Referring initially to FIG. 1, a digital projector according to an embodiment of the present invention is shown at 10. Digital projector 10 may include a projector housing 12, a handle 14, a projection lens 16, a control panel 18, and an access panel 20.

Access panel 20 may be configured to provide access to the interior of the projector housing, so that necessary maintenance, service, and/or repair may be performed on the projector components. The panel may be configured so that it may be opened manually, that is, openable by hand without requiring the use of a tool or key. The panel may be further configured so that it remains associated with the projector housing while it is open.

Access panels typically are secured with one or more screws or other fasteners that require manipulation with a tool in order to remove the panel. In contrast, access panel 20 may be opened manually, that is, the retention mechanism that normally keeps the access panel closed may be disabled without the use of a tool or other device. For example, the access panel may be held closed by a latching device 22, such as a snap latch, a spring latch, or a hook latch, among others. For example, access panel 20 may be opened by depressing one or more latch actuators 24 such as a button or lever.

Figure 2:
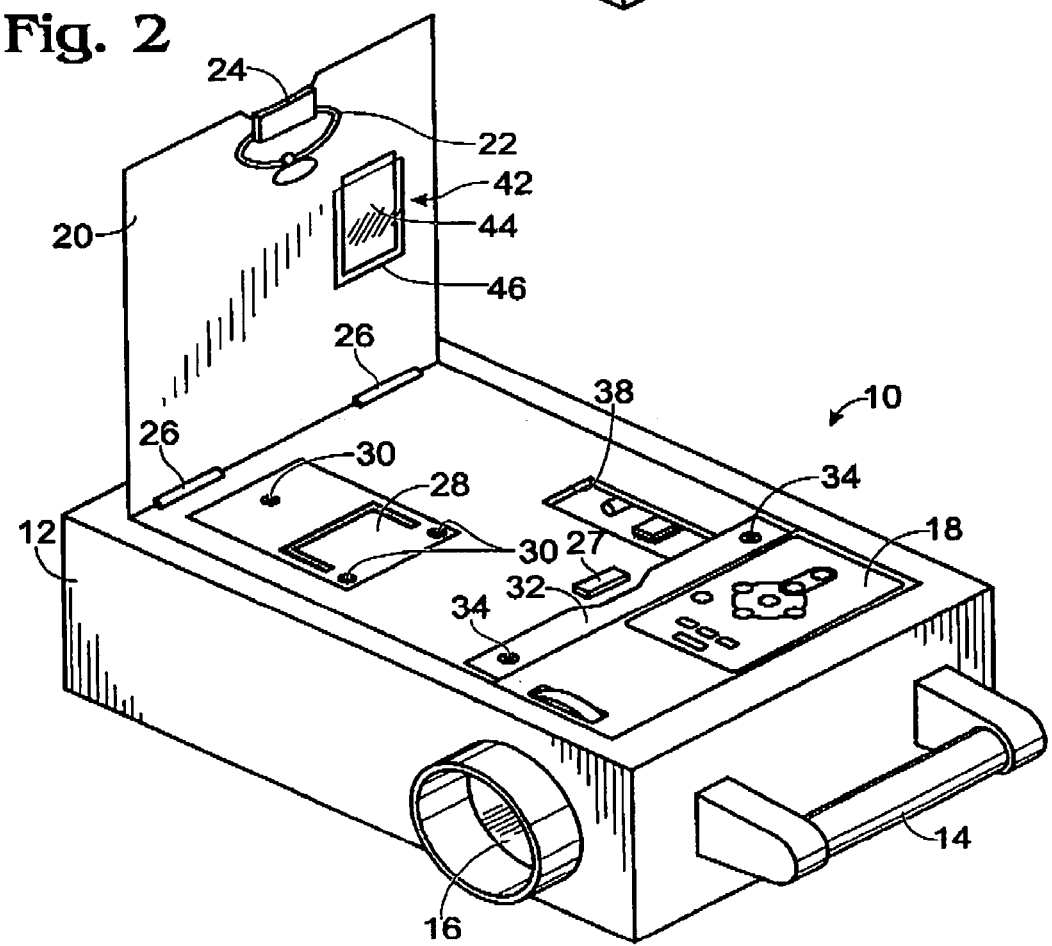
FIG. 2 is the digital projector of FIG. 1, including an open panel.

The panel may be further configured so that it remains associated with the projector housing while it is open. That is, even when open, the access panel remains connected to the projector housing. The access panel may be associated using a strap or cable, so that when open it remains physically connected to the projector housing. Alternatively, the access panel includes a pivotal connection to the projector housing. The pivotal connection may permit the access panel to be rotated out of the way upon opening, such as where the pivot point is located at a corner of the panel. Alternatively, the pivotal connection may include one or more hinges 26, located along an edge of the access panel, so that the panel pivots away from the projector housing, but remains connected to the housing, as shown in FIG. 2. It should be appreciated that the access panel may be incorporated in an upper surface of the projector (as shown) or may be incorporated in a lower surface, or on the side, of the projector.

Figure 3:
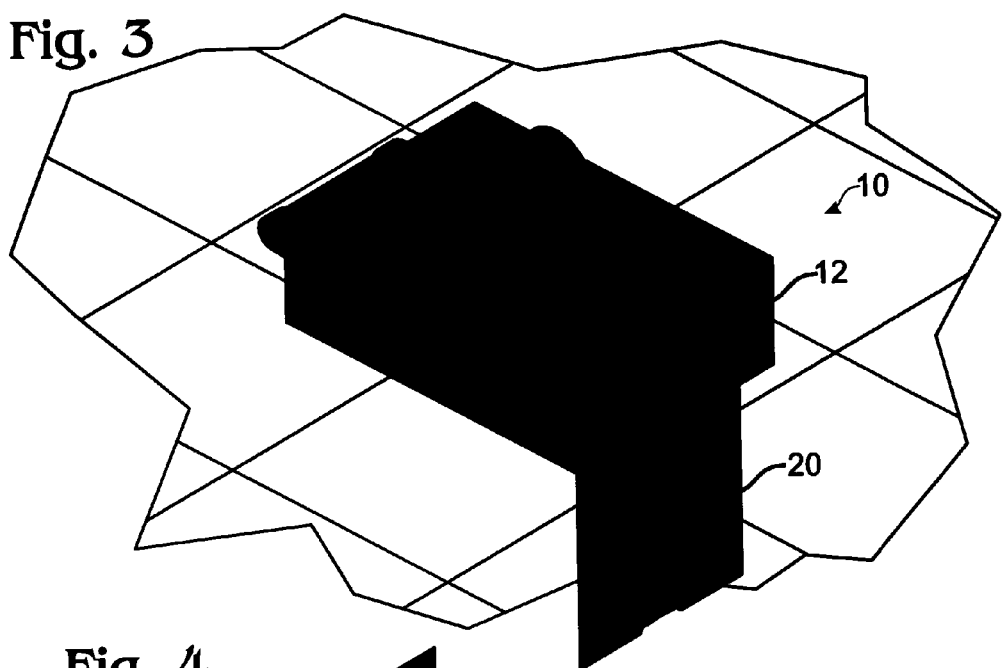
FIG. 3 is the digital projector of FIG. 1, showing the removal of a lamp module and an upgradeable module.

As access panel 20 remains connected to the projector housing even when open, panel 20 is prevented from being misplaced or dropped. In particular, where projector 10 may be installed on a ceiling, as shown in FIG. 3, it is particularly advantageous that the access panel need not be held or physically removed in order to access the interior of the projector housing, and such repair or maintenance tasks that may require access to the interior of the projector are therefore greatly simplified. In particular, where the access panel is incorporated on the upper surface of the projector, the projector may be mounted upside down relative to a typical orientation for the projector.

Projector housing 12 typically encloses the components of the digital projector. The projector components may include lamps or other light sources, optical filters, image-forming elements, mirrors, projection optics, processors, and the like. In particular, the projector may include a light source, such as a broad spectrum light source, a full spectrum light source, or a white light source. Selected appropriate light sources may include, among others, metal halide lamps, xenon lamps, halogen lamps, mercury vapor lamps, plasma lamps, and incandescent lamps. One or more of the projector components may be rendered more accessible for the purposes of maintenance, service, or repair by opening access panel 20. Alternatively, or in addition, the projector components may be rendered more accessible for removal and replacement, for example where a projector component may be upgraded. The removable component may be completely enclosed unless the access panel is open. Alternatively, the removable component may be accessible during projector operation, but only removable when the access panel is open.

Projector 10 may incorporate one or more safety measures to insure the safety of a user that opens access panel 20, or to prevent damage to the projector itself. For example, the projector may include a safety interlock 27, configured to help prevent electrical shocks or other injury to a user. The safety interlock may include a button that is depressed when access panel 20 is in the closed position, and released when access panel 20 is in the open position, such that when access panel 20 is opened the projector is disabled, for example by interrupting the electrical connection to one or more projector components. Alternatively, or in addition, the safety interlock may include a locking mechanism, such as a solenoid or electromagnet, among others, that prevents the user from opening panel 20 while the one or more hazardous conditions exist within the projector housing, or while one or more projector components may be vulnerable to damage. For example, the user may be prevented from opening panel 20 while the projector is energized (i.e., connected to an electrical power supply), or while the light source has a temperature above a determined threshold temperature, among other hazardous conditions.

Access panel 20 may provide access to the light source for the projector, so that the light source may be repaired or replaced. As many light sources require high voltage, and/or operate at very high temperatures, the light source may be enclosed in a protective cage that is not accessible until the panel is opened. For example, as shown in FIG. 2, the projector lamp may be at least partially enclosed in a lamp module 28 that is removable for service or replacement. The lamp module may be secured by one or more mechanical fasteners, such as screws 30, and may have separate electrical interconnections, safety interlock switches, and related wiring harnesses.

Projector 10 may include one or more projector components that are removable only when the access panel is open. For example as shown in FIG. 2, projector 10 includes a control panel module 32. Control panel module 32 includes an external control panel 18 that is accessible when the access door is closed, thereby permitting operation of the projector, however the control panel module cannot be removed. By opening access panel 20, control panel module fasteners 34 are made accessible, permitting the removal of the control panel module for repair or replacement. The access panel therefore provides a convenient way to upgrade the control panel module, in order to accommodate advances in projector control systems.

Figure 4:
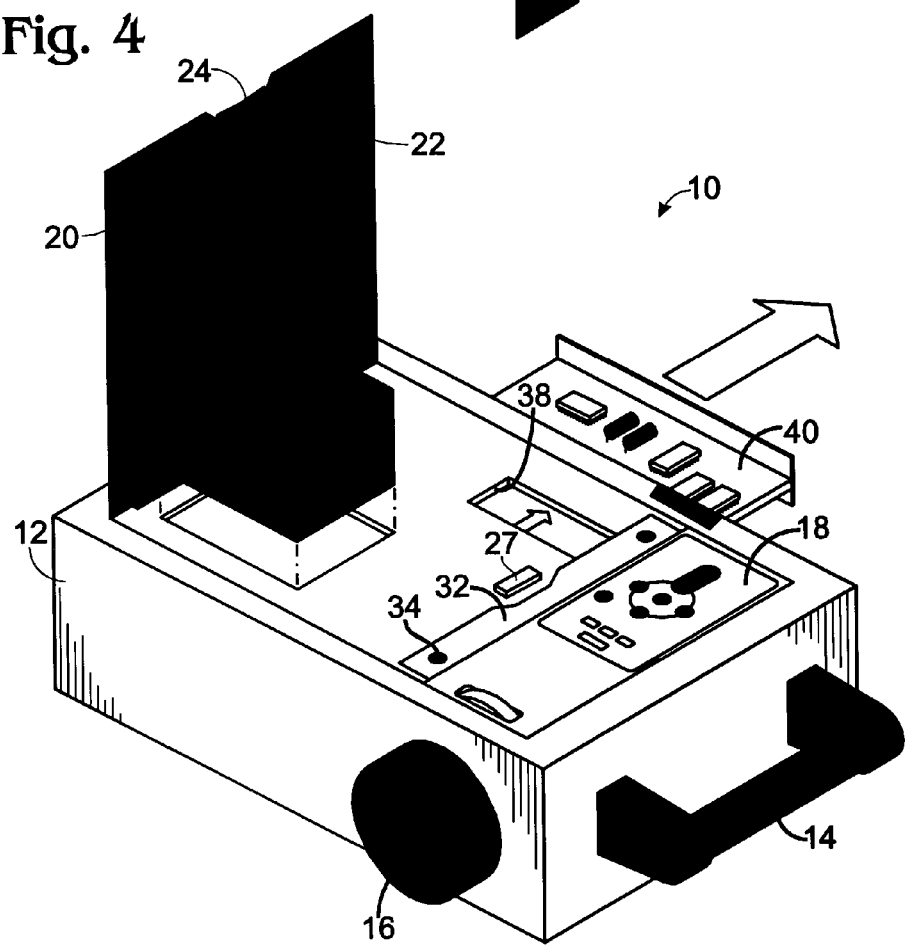
FIG. 4 is the digital projector of FIG. 1, with the access panel open, mounted on a ceiling.

Also as shown in FIG. 2, projector housing 12 includes a module access aperture 38. The module access aperture may permit access to one or more mechanical fasteners, such as screws and latches, among others, that secure a projector component, so that the component may then be removed. Alternatively, or in addition, the module access aperture may permit a user to access a module 40 in order to urge the module out of the projector housing, as shown in FIG. 4, particularly where module 40 would be otherwise difficult to remove. Such removable and/or accessible modules may include circuit boards, data ports for data transfer, processors, control panels, and/or one or more components of the projector light engine, among other components.

Access panel 20 may further provide access to printed information. The printed information may include, among other information, service information 42 as shown in FIG. 2. The service information may be preprinted by the manufacturer, or may be provided by a local service representative. The service information may include an identification of a projector service provider, including contact information, so that repair or maintenance of the projector may be facilitated. The service information may be in the form of a business card 44, that is retained in a business card display device 46 disposed, for example, on the underside of the access panel.

Figure 5:
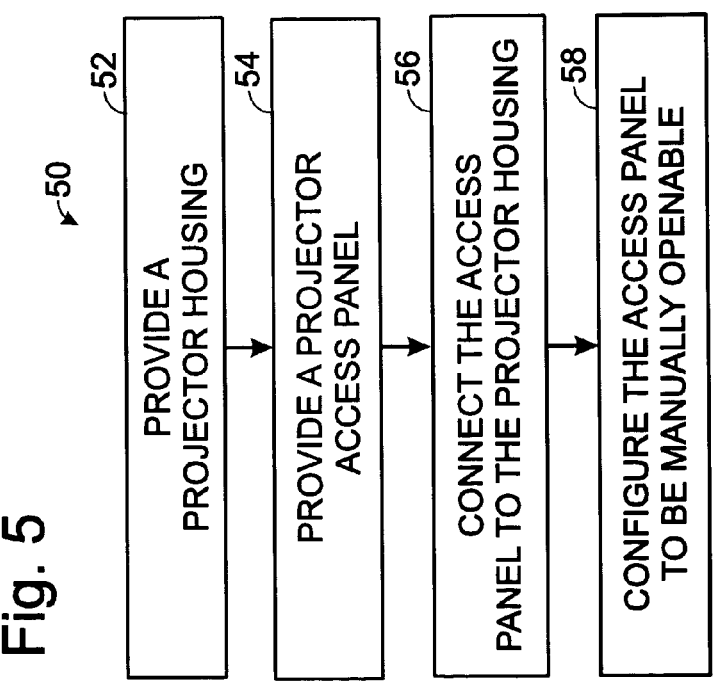
FIG. 5 is a flowchart depicting a method of making a digital projector, according to an embodiment of the invention.

A digital projector as described herein may be manufactured according to the method set out in flowchart 50 of FIG. 5. The illustrated method includes providing a projector housing at 52; providing a projector access panel at 54; connecting the access panel to the projector housing, so that the access panel remains associated with the projector housing while open at 56; and configuring the access panel so that it is manually openable at 58.

Figure 6:
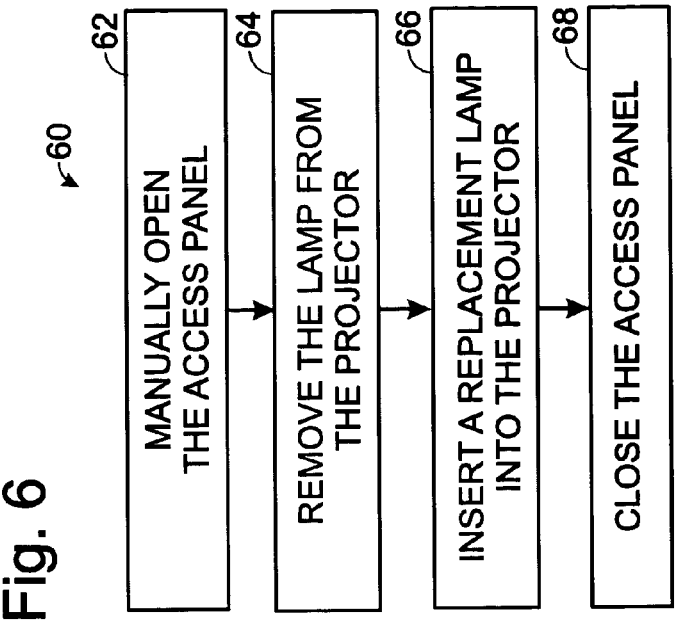
FIG. 6 is a flowchart depicting a method of changing a projector lamp, according to an embodiment of the invention.

It should be appreciated that where the digital projector described herein includes a manually openable panel that provides access to the lamp, and that remains associated with the projector while open, such a projector provides advantageous properties for a method of changing a projector lamp, as set out in flowchart 60 of FIG. 6. The illustrated method includes manually opening the panel at 62, removing the lamp from the projector at 64, and inserting a replacement lamp in the projector at 66. The method may further include closing the panel, set out at 68 of FIG. 6.

Figure 7:
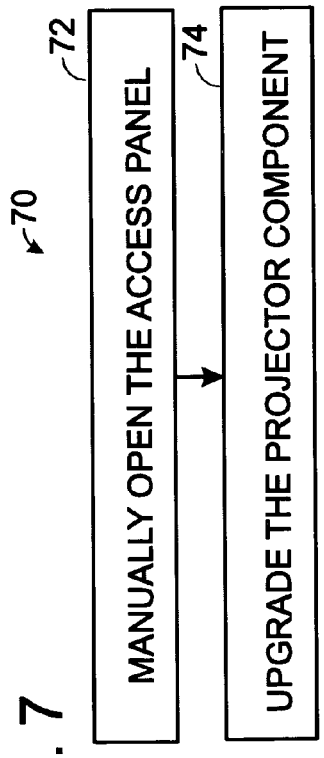
FIG. 7 is a flowchart depicting a method of upgrading a projector component, according to an embodiment of the invention.

Similarly, the digital projector described herein is well-suited to a method of upgrading the digital projector, as set out in flowchart 70 of FIG. 7, the illustrated method including manually opening the panel at 72, and upgrading the component at 74.

While various alternative embodiments and arrangements of a digital projector having an access panel have been shown and described above, it will be appreciated by those of skill in the art that numerous other embodiments, arrangements, and modifications are possible and are within the scope of the invention. In other words, those skilled in the art will understand that many variations may be made therein without departing from the spirit and scope of the invention as defined in the following claims. The present description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. A digital projector, comprising:
   a projector housing; and
   a manually openable panel that provides access to the interior of the projector housing, where the panel remains connected to the projector housing while open;
   where the panel provides access to a projector component that is a control panel module, and where a control panel, included with the control panel module, is accessible when the panel is closed.

2. The digital projector of claim 1, wherein the digital projector is configured to mount to a ceiling, and wherein the digital projector is configured so that the panel is accessible when the digital projector is mounted to the ceiling.

3. The digital projector of claim 2, where the panel is openable by depressing a latch actuator.

4. The digital projector of claim 1, where the digital projector is configured so that the projector component is only removable when the panel is open.

5. The digital projector of claim 1, where the panel additionally provides access to a projector component that includes a lamp module.

6. The digital projector of claim 1, where the panel provides access to service information when open.

7. The digital projector of claim 6, where the service information includes an identification of a projector service provider.

8. The digital projector of claim 6, where the panel provides access to a business card display device.

9. The digital projector of claim 1, further comprising a safety interlock configured to interact with the panel.

10. The digital projector of claim 9, where the safety interlock is configured to disable at least one projector component when the panel is open.

11. The digital projector of claim 9, where the safety interlock is configured to prevent the panel from opening while a hazardous condition exists within the projector housing.

12. The digital projector of claim 1, further comprising a means for disabling the digital projector when the panel is operated.

13. The digital projector of claim 1, further comprising a means for disabling the panel while a hazardous condition exists within the projector housing.

14. The digital projector of claim 1, further comprising a means for providing access to projector service information.

* * * * *